Nov. 5, 1935.     H. F. BRAUN     2,020,253
UNIVERSAL JOINT
Filed Aug. 15, 1934     2 Sheets-Sheet 1

INVENTOR
Herman F. Braun
BY
Evans & McCoy
HIS ATTORNEYS

Nov. 5, 1935.   H. F. BRAUN   2,020,253
UNIVERSAL JOINT
Filed Aug. 15, 1934   2 Sheets-Sheet 2

INVENTOR
Herman F. Braun
BY
Evans & McCoy
HIS ATTORNEYS

Patented Nov. 5, 1935

2,020,253

UNITED STATES PATENT OFFICE 2,020,253

UNIVERSAL JOINT

Herman F. Braun, Lakewood, Ohio, assignor to Cleveland Steel Products Corporation, Cleveland, Ohio, a corporation of Ohio Application August 15, 1934, Serial No. 739,957

12 Claims. (Cl. 64—102)

This invention relates to universal joints and particularly to universal joints of the "knockdown" type.

One of the objects of the present invention is to provide a universal joint of improved construction, and which may be easily and readily assembled and disassembled.

Another object is to provide a universal joint construction having bearing cups or sleeves with new and improved means for mounting such cups or sleeves.

A further object is to provide a universal joint construction having removable bearing cups with an improved means, of simple construction, for holding the cups against axial and rotational movement in their supporting members.

With the above and other objects in view, the present invention consists in certain features of construction and combinations of parts to be hereinafter described with reference to the accompanying drawings, and then claimed.

In the drawings, which illustrate a suitable embodiment of the invention:

Figure 1:
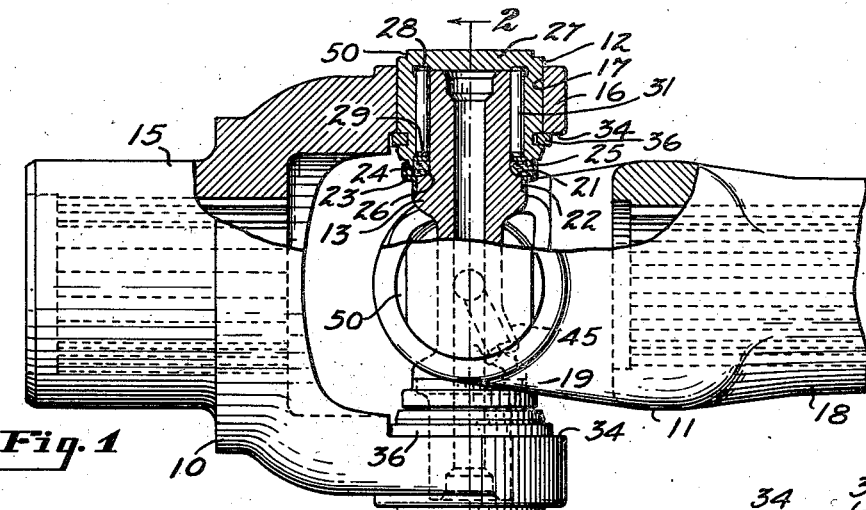
Figure 1 is a side elevation of the universal joint construction, a portion of the yokes being broken away to show parts of the universal joint in section.

In present day universal joints it is desirable to provide a construction of the knock-down type, in which the various parts can be easily and quickly assembled and disassembled to permit inspection and replacement of the bearing elements if necessary, and the present invention relates particularly to such a construction in which the number of parts is minimized and which can be economically manufactured.

Referring to the accompanying drawings, in which like numerals refer to like parts throughout the several views, I have shown a cross type universal joint, but it is to be understood that the invention is also applicable to other types of joints, for example, universal joints of the ring type.

The universal joint shown in the drawings comprises, in general, driving and driven members 10 and 11 respectively, each having a bearing cup 12 and a cross 13 having trunnions 14 which cooperate with the bearing cups 12.

The driving member 10 comprises a body portion 15 for attachment to a rotatable part, not shown, and is bifurcated at its one end to provide spaced arms 16 which are provided with co-axial apertures 17 for receiving the bearing cups 12. The driven member 11 is similarly provided with an attaching or mounting portion 18 and with spaced arms 19 also having co-axial apertures 17 for receiving the bearing cups.

The axes of the apertures 17, as in conventional constructions, are disposed in the same plane but at right angles to each other.

The cross 13 of the construction shown is formed with a central body portion 20 from which the trunnions 14 radially extend at 90° intervals, each trunnion projecting into an arm aperture.

Figure 3:
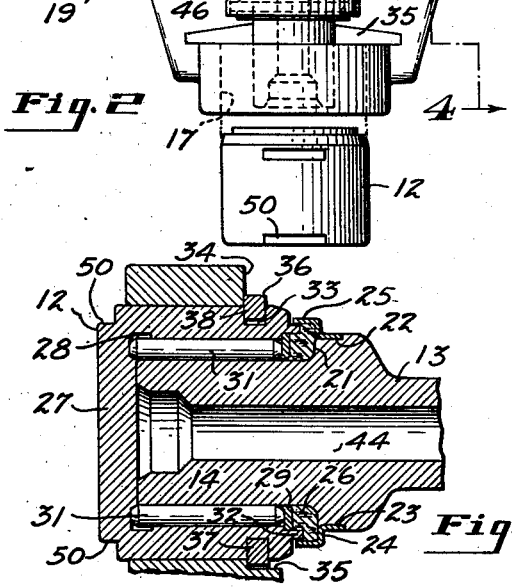
Fig. 3 is an enlarged section taken approximately on the line 3—3 of Fig. 2.

The cross 13, at the base of each trunnion 14, is formed with a radial surface 21 of greater diameter than the trunnion which intersects with a circumferential surface 22, as shown in Fig. 3, which surface 22 carries a cup-shaped stamping 23. The stamping 23 is preferably provided with a radial surface 24 substantially in the plane of the radial surface 21, and a circumferential flange 25 projecting beyond the radial surface 21 to surround the trunnion 14 in circumferentially spaced relation. A suitable oil and dust seal 26 of cork, felt, or other suitable material, surrounds the trunnion 14 and seats against the radial surfaces 21 and 24 within the flange 25, as shown in Fig. 3. This stamping is preferably mounted on the circumferential surface 22 by means of a press fit.

Each bearing cup 12 has a closed end 27 provided with an inner annular channel or recess 28. The opposite or open end of each cup is provided with an annular washer or stamping 29 pressed into a counterbored enlargement of the inner circumferential surface of the cup, the stamping being flanged at its inner periphery. The annular recess 28 and the inturned flange of the stamping 29 serve to hold a plurality of small diameter rollers 31 in position within the cup when the cup is disassembled from the joint structure. In other words, the bearing cup and rollers provide a self-contained bearing unit which can be assembled and disassembled as such without displacement of the rollers.

It is to be understood, however, that the rollers 31 may be replaced by a conventional solid bushing as the rollers do not necessarily form a part of the present invention.

In the assembled construction the bearing cups 12 are disposed in the apertures 17 and the rollers 31 circumferentially surround the trunnions 14. Also the inner faces of the closed ends 27 of the bearing cups 12 have bearing contact with the ends of the trunnions 14 to take the end thrust during operation of the joint. It will be noted that the open ends of the bearing cups 12 are formed with end portions 32 of reduced diameter which lie within the circumferential flanges 25 of the cup-shaped stampings 23. These reduced end portions, however, may be omitted and the flanges 25 arranged to overlap the circumferential surfaces of the cups 12.

In order to permit easy assembly and disassembly of the bearing cups, the diameters of the cups 12 and apertures 17 are finished in such manner as to provide a substantially free sliding fit.

Due to the oscillating action of the trunnions 14 during the operation of the joint, it is preferred to not only hold the bearing cups 12 against outward axial displacement but also to hold the cups against rotation in their surrounding apertures. I accomplish this by forming each bearing cup 12 with diametrically opposed recesses 33 in their circumferential surfaces. These recesses 33 are formed near the open end of the cup with flat bottoms and extend transversely of the axis of the cup.

Figure 2:
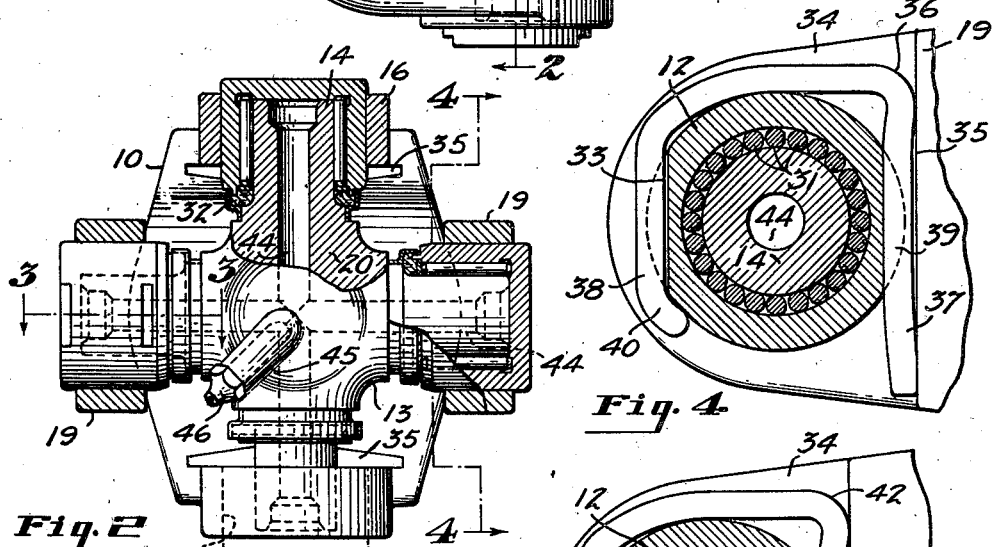
Fig. 2 is a vertical, transverse section taken approximately on the line 2—2 of Fig. 1.
Figure 4:
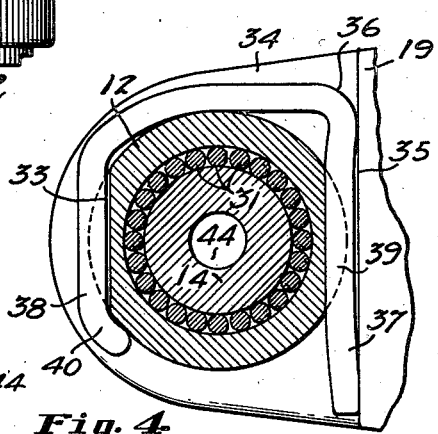
Fig. 4 is an enlarged section taken approximately on the line 4—4 of Fig. 2.
Figure 5:
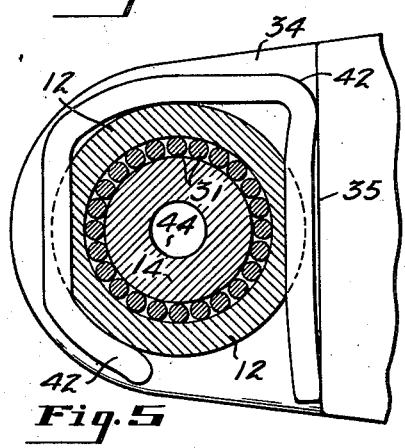
Fig. 5 is a section similar to Fig. 4, showing a modified type of spring means for holding the bearing cup in position.

Each of the yoke arms is also recessed along its radially inner face to provide a flat, longitudinally extending surface 34 and a flat, transversely extending shoulder or abutment surface 35, as shown in Figs. 2 and 4. When the bearing cup is assembled it is arranged with the bottoms of the recesses parallel to the abutment surface 35, with one of the recesses facing the adjacent abutment surface 35, and with the radially outward walls of the recesses flush with the flat, longitudinally extending face 34.

A generally U-shaped member 36 of spring metal, such as shown in Fig. 4, is employed to hold the cup against axial and rotational movement and is forced over the cup with its arms 37 and 38 disposed within the recesses 33. The arm 37 is offset centrally to provide the central portion 39 thereof with a flat surface which abuts against substantially the entire flat bottom of the adjacent recess 33. The ends of the arm 37 seat against the abutment surface 35 at spaced points, and because of the resiliency of the arm 37 cause the arm 37 to engage the bottom of the recess 33 with a substantial pressure to hold the bearing cup against rotation.

The closed end of the spring member 36 preferably engages the cup 12 and the arm 38 is formed with an inturned end 40 to resiliently engage the surface of the bearing cup beyond the edge of the recess within which the arm 38 is positioned. The arms 37 and 38 also project beyond the radially inner edge of the adjacent aperture to overlap the flat longitudinal face 34 of the yoke arm to hold the bearing cup against outward axial movement.

Since the spring member 36 is of spring material and is forced against its tension over the bearing cup 12, it is held against inadvertent displacement by reason of its tension and the inturned end 40. Also, the tension created by the offset central portion 39 and ends of the arm 37 firmly hold the cup against rotation within its surrounding aperture.

When it is desired to disassemble the joint, the spring members 36 can be forced by any suitable tool out of its locking position, after which the cups 12 may be slipped from their surrounding apertures and the cross removed from the yokes.

In Fig. 4 I have shown a slightly modified spring member 42 in which both arms thereof engage the bottoms of the recesses in the bearing cup and in which the inturned portion 43 of the one leg substantially continuously engages the circumferential surface of the bearing cup 12.

If desired, the outer ends of the cups may be formed with opposed slots 50 so that a suitable tool may be engaged therewith to rotate the cup during its removal in case the bearing cup should, through its continued used in the joint or corrosion, become set.

In Figs. 1 and 2 I have shown means for lubricating the bearings which include openings 44 drilled centrally through the trunnions 14 which intersect each other at the central portion 20 of the cross 13. The cross is provided with a boss 45 at its central portion which is formed with a passageway communicating with the region of intersection of the openings 44. The boss is provided with a grease gun connection or fitting 46. The grease gun 46 and the passage in the boss 45 are arranged at an angle with respect to the cross to permit easy access to the fitting 46 between the arms of one of the yokes.

Figure 6:
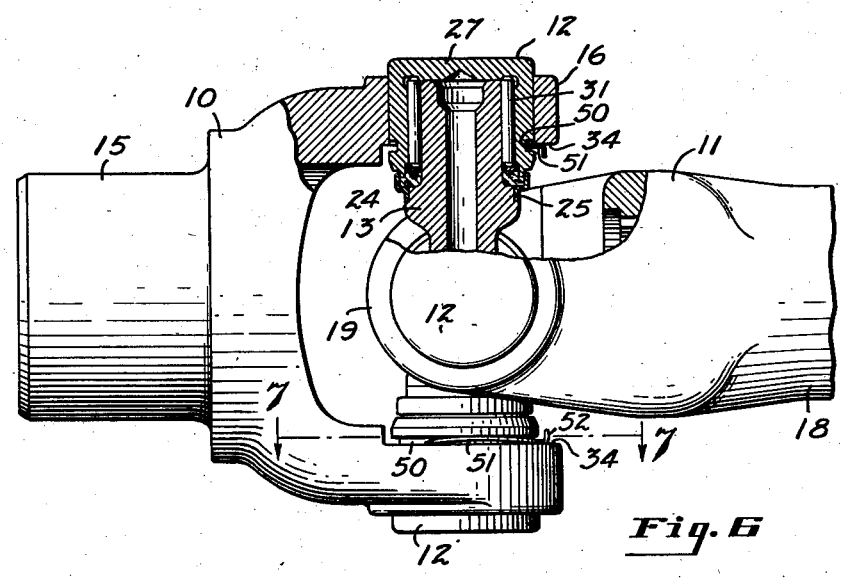
Fig. 6 is a view of a universal joint similar to Figure 1 but showing a modified means for holding the bearing cups in position.
Figure 7:
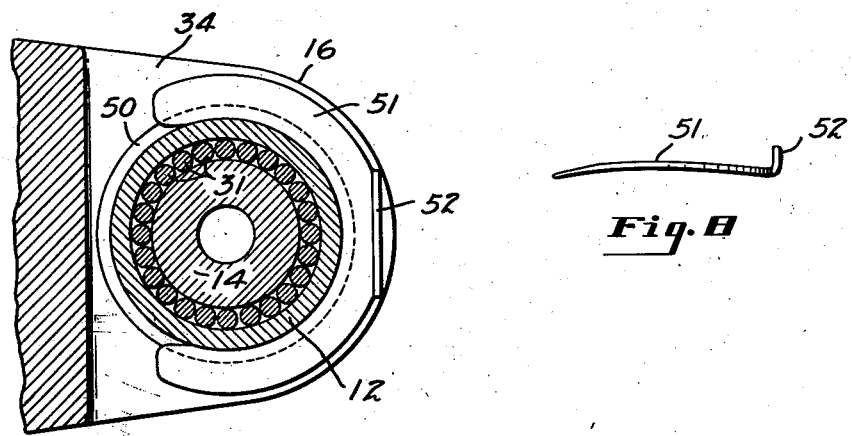
Fig. 7 is an enlarged section taken substantially in line 7—7 of Fig. 6.
Figure 8:
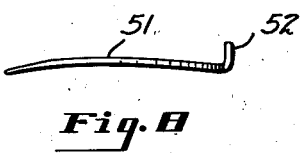
Fig. 8 is a side elevation of the modified cup holding means.

In the modified construction shown in Figs. 6 to 8, similar parts of the joint proper carry the same numerals as the construction shown in Figs. 1 to 5. In this modified construction, the bearing cups 12 are each provided with a continuous circumferential groove 50, preferably of channel shape, and arranged so that the side wall thereof nearest the closed end of the cup will lie slightly within the surrounding yoke arm aperture.

The cup holding means comprises a spring metal circular member 51 open at one side and laterally dished. The member 51 also is preferably provided with a flange-like finger portion 52.

When the bearing cups 12 are assembled in their respective yoke arms, the members 51 are positioned against the cups and within the grooves 51 and forced into position, the edges of the members 51 springing outwardly until the ends thereof have extended past the radial center line to seat the members completely against the bottoms of the grooves 50. The legs of the members 51 securely hold the members in position by reason of their resiliency and prevent inadvertent displacement of the same. These members overlap the groove side walls and the abutment faces 34 and hold the bearing cups 12 against axial displacement.

Also, the members 51 are so deformed laterally that they bear against abutment faces 34 and sidewalls of the grooves 50 with considerable pressure which is of sufficient magnitude to hold the bearing cups against any substantial rotational movement.

The tongue or finger portions 52 are so arranged that a screw driver or other suitable tool may be disposed between them and the bearing cups to force the members 51 from their clamping engagement with the bottoms of the grooves 50.

The constructions described can be economically manufactured in quantities by reason of their simplicity and small number of parts, and may be quickly and easily assembled and disassembled.

Although two embodiments of the invention have been herein shown and described it will be understood that numerous details of the construction shown may be altered or omitted without departing from the spirit of this invention as defined in the following claims.

What I claim is:

1. In a universal joint, a rotatable member having spaced coaxial apertures, a second member having aligned oppositely disposed trunnions projecting into said apertures, bearing units for said trunnions including bearing cups surrounding said trunnions and circumferentially engaging the walls of said apertures with a substantially slidable fit and having end bearing engagement with said trunnions, the circumferential portions of said cups in engagement with the walls of said apertures being of uniform diameter from end to end, and means for holding each of said cups against rotational and outward axial movement, said means including a recess in the circumferential surface of the cup extending transversely of the axis thereof and a transversely extending element having portions projecting into said recess and overlapping the radially inner edge of the aperture surrounding the cup, said element having a portion firmly abutting the bottom of the recess and end portions firmly abutting said rotatable member in a plane substantially parallel to the axis of said trunnions.

2. In a universal joint, a rotatable member having spaced coaxial apertures, a second member having aligned oppositely disposed trunnions projecting into said apertures, bearing units for said trunnions including bearing cups surrounding said trunnions and circumferentially engaging the walls of said apertures with a substantially slidable fit and having end bearing engagement with said trunnions, the circumferential portions of said cups in engagement with the walls of said apertures being of uniform diameter from end to end, and means for holding each of said cups against rotational and outward axial movement, said means including a recess in the circumferential surface of the cup extending transversely of the axis thereof and a transversely extending element having portions projecting into said recess and overlapping the radially inner edge of the aperture surrounding the cup, said element having a portion firmly abutting the bottom of the recess and end portions firmly abutting said rotatable member in a plane substantially parallel to the axis of said trunnions, said element being of spring metal and exerting pressure against the bottom of said recess.

3. In a universal joint, a rotatable member having spaced coaxial apertures, a second member having aligned oppositely disposed trunnions projecting into said apertures, bearing units for said trunnions including bearing cups surrounding said trunnions and circumferentially engaging the walls of said apertures with a substantially slidable fit and having end bearing engagement with said trunnions, the circumferential portions of said cups in engagement with the walls of said apertures being of uniform diameter from end to end, and means for holding each of said cups against rotational and outward axial movement, said means including a recess in the circumferential surface of the cup extending transversely of the axis thereof, the bottom of said recess being flat, and a transversely extending element of spring metal projecting into said recess and overlapping the edge of the aperture surrounding the cup, said element having an offset portion substantially continuously engaging the bottom of said recess and end portions engaging said rotatable member with substantial pressure in a plane substantially parallel to the axis of said trunnions.

4. In a universal joint, a rotatable member having spaced coaxial apertures, a second member having aligned oppositely disposed trunnions projecting into said apertures, bearing units for said trunnions including bearing cups surrounding said trunnions and circumferentially engaging the walls of said apertures with a substantially slidable fit and having end bearing engagement with said trunnions, the circumferential portions of said cups in engagement with the walls of said apertures being of uniform diameter from end to end, and means for holding each of said cups against rotational and outward axial movement, said means including a pair of opposed recesses in the circumferential surface of the cup extending at opposite sides transversely of the axis thereof and a generally U-shaped element of spring metal having its legs projecting into said recesses and overlapping the radially inner edge of the aperture surrounding the cup, said rotatable member having a radially inner surface extending parallel to the axis of the aperture and transversely of the axis of rotation of the rotatable member, one of the legs of said element having a portion engaging the bottom of the adjacent recess and end portions engaging said radially inner surface.

5. In a universal joint, a rotatable member having spaced coaxial apertures, a second member having aligned oppositely disposed trunnions projecting into said apertures, bearing units for said trunnions including bearing cups surrounding said trunnions and circumferentially engaging the walls of said apertures with a substantially slidable fit and having end bearing engagement with said trunnions, the circumferential portions of said cups in engagement with the walls of said apertures being of uniform diameter from end to end, and means for holding each of said cups against rotational and outward axial movement, said means including a pair of opposed recesses in the circumferential surface of the cup extending at opposite sides transversely of the axis thereof and a generally U-shaped element of spring metal having its legs projecting into said recesses and overlapping the radially inner edge of the aperture surrounding the cup, said rotatable member having a radially inner surface extending parallel to the axis of the aperture and transversely of the axis of rotation of the rotatable member, one of the legs of said element having central and end portions respectively engaging the bottom of the recess and said radially inner surface with substantial pressure.

6. In a universal joint, a rotatable member having spaced coaxial apertures, a second member having aligned oppositely disposed trunnions projecting into said apertures, bearing units for said trunnions including bearing cups surrounding said trunnions and circumferentially engaging the walls of said apertures with a substantially slidable fit and having end bearing engagement with said trunnions, the circumferential portions of said cups in engagement with the walls of said apertures being of uniform diameter from end to end, and means for holding each of said cups against rotational and outward axial movement, said means including a pair of opposed recesses in the circumferential surface of the cup extending at opposite sides transversely of the axis thereof and a generally U-shaped element of spring metal having its legs projecting into said recesses and overlapping the radially inner edge of the aperture surrounding the cup, said rotatable member having a radially inner surface extending parallel to the axis of the aperture and transversely of the axis of rotation of the rotatable member, one of the legs of said element having central and end portions respectively engaging the bottom of the recess and said radially inner surface with substantial pressure, the other of said legs having an end portion extending towards the first leg and yieldably gripping the cup.

7. In a universal joint, a rotatable member having spaced coaxial apertures, a second member having aligned oppositely disposed trunnions projecting into said apertures, bearing units for said trunnions including bearing cups surrounding said trunnions and circumferentially engaging the walls of said apertures with a substantially slidable fit and having end bearing engagement with said trunnions, the circumferential portions of said cups in engagement with the walls of said apertures being of uniform diameter from end to end, and means for holding each of said cups against rotational and outward axial movement, said means including a pair of opposed recesses in the circumferential surface of the cup extending at opposite sides transversely of the axis thereof and a generally U-shaped element of spring metal having its legs projecting into said recesses and overlapping the radially inner edge of the aperture surrounding the cup, said rotatable member having a radially inner surface extending parallel to the axis of the aperture and transversely of the axis of rotation of the rotatable member, one of the legs of said element having an offset central portion engaging the bottom of the adjacent recess and spaced end portions engaging said radially inner surface, said central and end portions being under substantial tension.

8. In a universal joint, a rotatable yoke member having spaced arms provided with coaxial apertures, each of said arms having a flat surface at the radially inner face thereof disposed parallel to the axis of its aperture and transversely of the axis of rotation of said yoke, a second member having opposed coaxial trunnions projecting into said apertures, bearing units for said trunnions including bearing cups having end bearing engagement with said trunnions, said cups surrounding said trunnions and circumferentially engaging the walls of said apertures with a substantially slidable fit, the circumferential portions of said cups in engagement with the walls of said apertures being of uniform diameter from end to end, each of said cups having a recess extending transversely of the axis thereof and facing the adjacent said flat surface, and a single means for holding the cup against outwardly axial movement and rotation relative to its surrounding aperture, said means including an element having portions overlapping the walls of said recess and said radially inner face, said element also having a portion abutting the bottom of the recess and portions abutting said flat surface.

9. In a universal joint, a rotatable yoke member having spaced arms provided with coaxial apertures, each of said arms having a flat surface at the radially inner face thereof disposed parallel to the axis of its aperture and transversely of the axis of rotation of said yoke, a second member having opposed coaxial trunnions projecting into said apertures, bearing units for said trunnions including bearing cups having end bearing engagement with said trunnions, said cups surrounding said trunnions and circumferentially engaging the walls of said apertures with a substantially slidable fit, the circumferential portions of said cups in engagement with the walls of said apertures being of uniform diameter from end to end, each of said cups having a recess extending transversely of the axis thereof and facing the adjacent said flat surface, and a single means for holding the cup against outwardly axial movement and rotation relative to its surrounding aperture, said means including an element of spring metal having portions overlapping the walls of said recess and said radially inner face, said element having central and end portions in tensioned abutting engagement with the bottom of said recess and said flat surface, respectively.

10. In a universal joint, a rotatable yoke member having spaced arms provided with coaxial apertures, each of said arms having a flat surface at the radially inner face thereof disposed parallel to the axis of its aperture and transversely of the axis of rotation of said yoke, a second member having opposed coaxial trunnions projecting into said apertures, bearing units for said trunnions including bearing cups having end bearing engagement with said trunnions, said cups surrounding said trunnions and circumferentially engaging the walls of said apertures with a substantially slidable fit, the circumferential portions of said cups in engagement with the walls of said apertures being of uniform diameter from end to end, each of said cups having opposed recesses at its opposite sides extending transversely of the axis thereof, one of said recesses facing the adjacent said flat surface, and a U-shaped element of spring metal for each cup having its legs overlapping the walls of said recesses and the adjacent said radially inner face to hold the cup against outwardly axial movement, one of said legs having tensioned engagement with the bottom of the adjacent recess and said flat surface to hold the cup against rotation.

11. In a universal joint, a rotatable yoke member having spaced arms provided with coaxial apertures, each of said arms having a flat surface at the radially inner face thereof disposed parallel to the axis of its aperture and transversely of the axis of rotation of said yoke, a second member having opposed coaxial trunnions projecting into said apertures, bearing units for said trunnions including bearing cups having end bearing engagement with said trunnions, said cups surrounding said trunnions and circumferentially engaging the walls of said apertures with a substantially slidable fit, the circumferential portions of said cups in engagement with the walls of said apertures being of uniform diameter from end to end, each of said cups having opposed recesses at its opposite sides extending transversely of the axis thereof, one of said recesses facing the adjacent said flat surface, and a U-shaped element of spring metal for each cup having its legs overlapping the walls of said recesses and the adjacent said radially inner face to hold a cup against outwardly axial movement, one of said legs having tensioned engagement with the bottom of the adjacent recess and said flat surface to hold the cup against rotation, the other of said legs having its end portion extending towards the other leg in yieldable gripping engagement with the periphery of the cup.

12. In a universal joint, a rotatable yoke member having spaced arms provided with coaxial apertures, each of said arms having a flat surface at the radially inner face thereof disposed parallel to the axis of its aperture and transversely of the axis of rotation of said yoke, a second member having opposed coaxial trunnions projecting into said apertures, bearing units for said trunnions including bearing cups having end bearing engagement with said trunnions, said cups surrounding said trunnions and circumferentially engaging the walls of said apertures with a substantially slidable fit, the circumferential portions of said cups in engagement with the walls of said apertures being of uniform diameter from end to end, each of said cups having a circumferential groove in its external face, and a single means for holding the cup against substantial outwardly axial movement and against substantial rotation relative to its surrounding aperture, said means including a U-shaped spring metal member having portions overlapping the walls of said groove and said radially inner face, said element being deformed laterally and engaging said last mentioned walls and face with sufficient axial pressure to prevent substantial rotation of the bearing cup, and having sufficient resiliency to engage the bottom of said groove with sufficient pressure to resiliently lock itself in position.

HERMAN F. BRAUN.